Dec. 30, 1969 F. A. LOESCHER 3,486,757

RECORD CLEANING DEVICE

Filed April 10, 1967 2 Sheets-Sheet 1

United States Patent Office 3,486,757

Patented Dec. 30, 1969

3,486,757

RECORD CLEANING DEVICE

Friedrich A. Loescher, Glaris-Davos, Switzerland, assignor to Lenco A.G., Burgdorf, Switzerland Filed Apr. 10, 1967, Ser. No. 629,798
Claims priority, application Switzerland, Apr. 18, 1966, 5,661/66
Int. Cl. G11b 3/58
U.S. Cl. 274—47 14 Claims

ABSTRACT OF THE DISCLOSURE

Record cleaning device for attachment to a record player, and having a movable arm carrying a wiping pad, riding on the grooved surface of the record disc during rotation thereof and controlling the emission of cleaning fluid through an opening of a fluid container supported by the movable arm. The cleaning fluid wets the wiping pad which transmits the fluid to the record surface while collecting fibers and dust. When the movable arm is lifted and the wiping pad moved off the record disc, the emission of cleaning fluid through the opening is interrupted.

BACKGROUND OF THE INVENTION

The present invention relates to an improved device for the cleaning of records during the playing of such records on the record player.

Under optimal conditions of production and operation present day records consisting substantially of polyvinyl chloride permit a playback which is practically free of undesirable noise or interference. However, the conditions of operation may be detrimentally affected by fibers and dust settling on the surface of the records. Electrostatic charging of the record favours the depositing of such fibers and dust on the record surface. In addition, such charging causes a direct increase in the noise level due to discharge currents influencing the amplifier and becoming audible in the loud-speaker as roaring, crackling or rustling noises. The dust collected on the disc, consisting to a large part of sand grains, leads to a noticeable wear of the needle and of the record. A further cause of wear are the friction forces which are effective at the small contact surfaces between needle and record.

DESCRIPTION OF THE PRIOR ART

Up to date so called "anti-static" rags or "anti-static" sprays were mainly used to remove dust from the record and to prevent electrostatic charging thereof. The basis of such "anti-statics" is the use of hygroscopic compounds, usually in the form of methyl glycol, to produce on the record a thin moisture film and to maintain the latter. However, experience has shown that the latter object is not obtained and the use of such means is consequently insufficient.

In addition, "anti-static" liquids have an important drawback in so far as they form a paste together with dust, such paste having the characteristics of a grinding agent in view of its composition. As a result, this paste damages record and needle at least to the same extent as dry dust. Moreover, such paste will eventually dry and harden and form crusts on the needle and in the grooves of the record and impair the sound quality quite considerably. These hard crusts or deposits separate upon wiping of the record and lead to additional scratching of the surface and to a further increase in undesirable noise.

It has already been suggested to clean the record by means of a set of brushes which rest on the record when the latter is played. One of the brushes having long and relatively hard bristles leads the set ahead of the pick-up along the grooves, while a second brush having short and relatively thin bristles collects and holds the dust. The second brush is wetted with an "anti-static" liquid to reduce electrostatic charging of the disc.

While this device effectively aids in the removal of fibers and dust, it is not sufficiently effective in preventing electrostatic charging of the disc since the liquid film is too thin to act as intended. Moreover, it does not reduce the friction forces between groove and needle.

SUMMARY OF THE INVENTION

The primary object of the present invention is the provision of means to effectively remove fibers and dust from records.

A further important object of the present invention relates to a device for the efficient cleaning of records while preventing electrostatic charging thereof.

Another significant object of the present invention concerns the provision of a record cleaning device which at the same time is capable of minimizing friction between the pick-up needle and the grooves of a record.

Still another noteworthy object of the present invention is the provision of a record cleaning device which is adapted for attachment to existing as well as new record players and for operation simultaneously with the playing of such records.

A further object of the present invention relates to a simple and efficient means for automatically dispensing liquid from a record cleaning device while in operation on a record being played.

Yet another object of the present invention is to provide a cleaning fluid for records which is effective in reducing friction between the needle of a pick-up and the record grooves thereby insuring longer life of such records.

Now, in order to achieve these and still further objects which will become more readily apparent as the description proceeds, the invention device makes use of a cleaning pad supported by a swiveling arm structure and adapted to ride on the grooved surface of a record while controlling the dispensing of liquid from a container carried by such arm. More specifically, the cleaning pad is interconnected with an opening of the liquid container and receives cleaning liquid therefrom while riding on the record surface. When the cleaning pad is lifted out of contact with the surface of the record further supply of liquid thereto is stopped.

BRIEF DESCRIPTION OF THE DRAWINGS

The invention will be better understood, and objects other than those set forth above will become apparent when consideration is given to the following detailed description thereof. Such description makes reference to the annexed drawings, in which.

DESCRIPTION OF THE PREFERRED EMBODIMENTS

Figure 1:
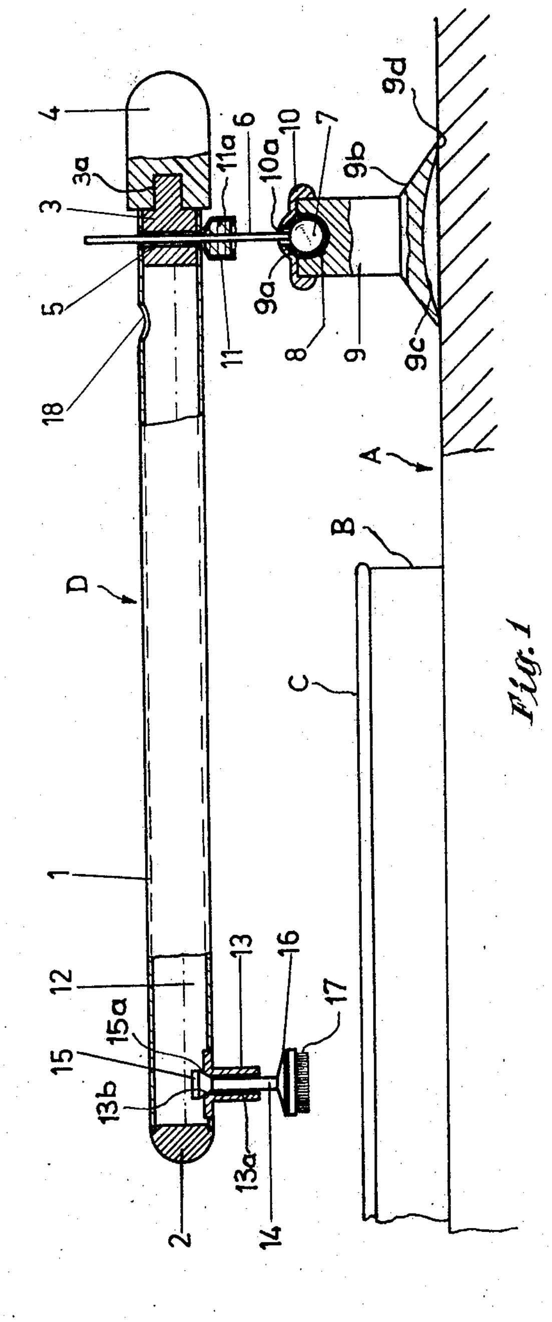
FIGURE 1 is a first embodiment of a record cleaning device shown in elevation with parts thereof in vertical section.

In the drawings reference character A generally designates a mounting plate of a conventional record player having a turntable B with a record C placed thereon. Other conventional elements of the record player, such as pick-up and pick-up arm have been omitted for the sake of clarity.

The cleaning device generally indicated at D comprises an arm member formed by a thin walled tube 1 of light-weight and preferably transparent material such as a suitable synthetic material. Tube 1 is closed at both of its ends by plug members 2 and 3, respectively. Plug member 3 arranged at the rear end of tube 1, is formed with an extension 3$a$ engaging a counter-weight 4, which in certain instances may be omitted. The rear end of tube 1 and the plug member 3 are provided with a transverse bore 5 through which a guide pin 6 forming pivot means, extends. Guide pin 6 which slidably fits into bore 5 is connected at its lower end to a ball-shaped member 7. A spherical bearing 8 seats ball-shaped member 7 and is in turn held in an upper cavity 9$a$ of a socket means or member 9. Socket member 9 which is made of rubber or a soft and resilient synthetic material, such as a suitable quality of plasticized PVC, is integral with a frustoconical base 9$b$ in which a lower cavity 9$c$ is provided. Base 9$b$ and cavity 9$c$ form a suction cup, whereby socket member 9 may be secured to mounting plate A, at least temporarily. Additionally, the planar rim surface 9$d$ of base 9$b$ may be provided with a suitable adhesive which may be activated such as by wetting or by heating, so as to hold socket 9 in place. A cover member 10, having a central bore 10$a$ through which guide pin 6 projects is seated on socket member 9 and holds ball-shaped member 7 in bearing 8. A locking sleeve 11 is arranged on guide pin 6 and frictionally engages the latter by means of a rubber or plastic insert 11$a$. While locking sleeve 11 may be manually displaced on guide pin 6, the frictional engagement of the latter by insert 11$a$ is such as to hold tube 1 and attached part forming the arm member in a desired position on guide pin 6.

The forward end of tube 1 fitted with plug member 2 holds a flanged sleeve 13 arranged at right angles with respect to the tube and extending downwardly from the lower side thereof. Sleeve 13 comprises an outlet opening or bore 13$a$ communicating by way of an internal tapered valve seat 13$b$ with a liquid container or reservoir 12 formed within tube 1. A downwardly depending valve stem 14 of smaller diameter than bore 13$a$ and extending through bore 13$a$ is integral with a valve member 15 having a frusto-conical valve surface 15$a$ formed thereon. Valve surface 15$a$ fits into the taper of valve seat 13$b$ and forms together with the latter a valve means for container 12. Preferably valve surface 15$a$ and valve seat 13$b$ are made to fit into each other by grinding the corresponding surfaces to exactly the same cone angle so as to form a liquid tight seal.

At its lower end valve stem 14 is rigidly connected to a disc shaped pad member 16, the downwardly directed face of which is covered by a cleaning pad means 17 made of a velours-type fabric or the like, the pile being downwardly exposed.

The rear end of tube 1 adjacent plug member 3 is provided with an upwardly directed opening 18 communicating with container 12 and permitting to supply the latter with a liquid.

Installation and operation of the device are as follows:

Record C is placed on turntable B. Subsequently, socket member 9 with guide pin 6 and locking sleeve 11 are placed on mounting plate A of the record player in a suitable location. This location must permit free horizontal swiveling movement of the arm member or tube 1 from the rim of the record C to the center thereof without interfering with the pick-up arm (not shown) in its corresponding movement during playing of the record. Socket member 9 is then temporarily secured in the selected location by depressing base member 9$b$ on mounting plat A and then relieving such member to create suction in cavity 9$c$. Subsequently, container 12 in tube 1 may be filled to about three fourths of its capacity with a wetting agent or cleaning liquid through opening 18. It will be noted that while filling container 12, cleaning pad 17 must be held clear of any obstruction in order to avoid inadvertent opening of valve bore 13$a$ toward container 12 and escape of liquid therefrom.

Arm member 1 may now be placed on guide pin 6 by inserting the latter into bore 5, all the parts now taking up the position shown in the drawing. In order to make cleaning pad 17 effective on the grooved surface of record C locking sleeve 11 is now downwardly displaced on guide pin 6 until cleaning pad 17 contacts record C. Guide pin 6 is slightly tilted out of its vertical position toward the record so that the forward end of arm member 1 is lowered. The arm member 1 should have an inclination of about 3 to 4° with respect to the surface of the record. At the same time, valve stem 14 must be free for limited downward as well as upward movement in valve bore 13$a$ in order to permit a corresponding movement of cleaning pad while riding on a record which is not absolutely flat, i.e. which is slightly warped.

The device may now be put in operation on a record. To this end cleaning pad 17 is positioned on the rim portion of the record and ahead of the pick-up in the direction of rotation of the turntable. The hairs or fibers of cleaning pad 17 engage the grooves of the record and guide such pad along the grooves toward the center of the record in synchronism with the relative movement of the pick-up. Thereby the hairs of the cleaning pad remove fibers and dust from the record surface. At the same time liquid flows from the container through valve bore 13, along valve stem 14 and over the disc to the surface of the record to wet the same. As a consequence, electrostatic charging is prevented and friction between needle and grooves of the record reduced due to the lubricating effect of the liquid. When the turntable stops at the end of the record, arm member 1 may be removed from guide pin and set aside on a support not shown. As soon as arm member 1 is lifted and cleaning pad 17 comes out of contact with the record, valve member 15 is drawn into valve seat 13$b$ under the combined weight of parts 14, 15, 16 and 17.

When the device has been tested with regard to the location of socket 9 on mounting plat A, the adhesive on rim 9$d$ may be activated to finally secure socket 9 in this location.

Figures 2, 3:
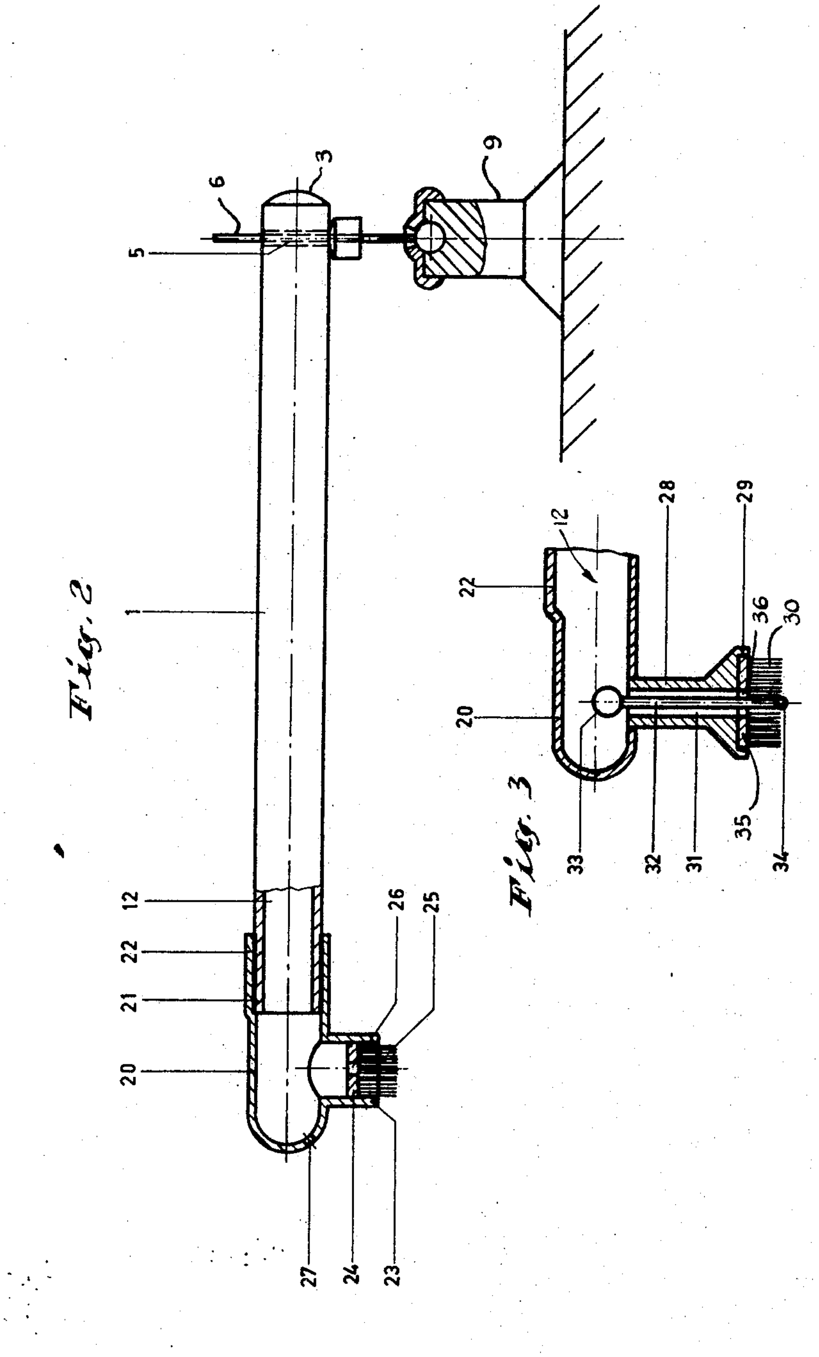
FIGURE 2 shows a second embodiment in a view corresponding to that of FIGURE 1.
FIGURE 3 illustrates a modification of the device according to FIGURE 2.

In FIGURE 2, showing the second embodiment, like parts are identified with the same reference numerals employed in FIGURE 1. Relative to this former embodiment, the embodiment of FIGURE 2 differs mainly with respect to the simplification of the means for controlling the emission of cleaning liquid from the container in order to avoid the necessity for accurately machined movable elements, such as the valve of FIGURE 1.

In order to control the emission of liquid from the container 12, the embodiment of FIGURE 2 makes use of the fact that the amount of liquid removed from the brush while in contact with the rotating record is a function of the local circumferential velocity and the amount of air admitted to the container or reservoir. Consequently, this embodiment provides for a controlled admission of ventilating air into the container in order to control the emission of liquid to the cleaning pad or brush. In addition, the embodiment of FIGURE 2 makes use of the capillary properties of the passages formed between closely set bristles of a brush.

In the embodiment of FIGURE 2, tube 1 is again seated on guide pin 6 in the manner shown in FIGURE 1; guide pin 6 being held in socket member 9. At its supported end, tube 1 is closed such as by plug member 3'. A counterweight, such as member 4 of the embodiment of FIGURE 1, is not necessary in this case. Equally, the opening 18 in tube 1 may be omitted.

At its free end, tube 1 is provided with a removable cap member 20 slidably seated on this tube. Locating means are provided on the cap member and the corresponding tube end in the form of an axially extending groove 22 in such cap member engaged by the key portion 21 on the exterior of tube 1. Locating means 21 and 22 prevent rotation of the cap member 20 relatively to tube 1 and maintain such cap member in a predetermined position with respect to the tube. Hollow cap member 20 comprises a downwardly directed tubular extension 23 seating a disc member 24. Disc member 24 forms a holder for a brush 25, extending downwardly from tubular extension 23 and constituted by a multitude of closely set elastic bristles. Disc member 24 is provided with at least one bore 26 forming an outlet opening for reservoir 12, communicating with such bore by way of hollow cap member 20 and tubular extension 23. In its free end, cap member 20 has a ventilating bore 27 of very small diameter, admitting outside air into the reservoir.

Filling of the reservoir 12 with cleaning liquid is made possible by lifting the arm member formed by tube 1 and associated parts from guide pin 6 and removing cap member 20 from tube 1. With the arm member again being in position on guide pin 6, in filled condition of reservoir 12 and closed by cap member 20, the cleaning device is ready for operation. Brush 25 is brought into contact with the grooved surface of the record by swiveling arm member about guide pin 6. Liquid from the container 12 is permitted to escape through opening 26 and to substantially fill the capillary passages formed between the bristles of brush 25. During rotation of the record, such liquid contained in the brush is drawn from the capillary passages to wet the grooved surface of such record. Dust particles and fibers on the grooved surface are collected by the brush. To the extent that liquid is drawn from the brush, the capillary passages permit the escape of further liquid from reservoir 12 through opening 26 while a corresponding amount of air is admitted into the reservoir through opening 27. As a consequence, the rotation of the record relative to the brush causes a continuous flow of liquid through the brush 25, such flow being automatically interrupted when the record stops and the air member is lifted off the record surface due to the capillary properties of the brush. The actual amount of liquid supplied to the brush and thereby the amount of liquid deposited on the grooved record surface is determined by the cross section of opening or openings 26 and the cross section of ventilating bore 27. Consequently, these openings or bores 26 and 27 constitute means for controlling the emission of liquid from the reservoir. FIGURE 3 illustrates a modified form of such means for controlling the emission of liquid from the reservoir. In the modification of FIGURE 3, a cap member 20 which is again considered to be attached and positioned relative to tube 1 in the manner described in connection with FIGURE 2, carries a downwardly extending tube 28 terminating in a flanged portion 29. At its lower side, flanged portion 29 carries a brush 30, the disc-shaped holder 35 of this brush being provided with a central bore 36. Bore 36 communicates with the passage 31 in the interior of tube 28 opening into hollow cap member 20 so as to form a connection with reservoir 12. A straight wire portion or pin 32 extends from the interior of cap member 20 through passage 31, bore 36 and brush 30 and carries at its lower end a ball 34 made of suitable plastic. The upper end of pin 32 is provided with a ball-shaped head 33 made of metal.

In operation, brush 30 is supplied with liquid from container 12 by way of passage 31 and bore 36 as soon as ball 34 is in contact with the rotating record and has started to transmit vibrations to pin 32 thereby causing the admission of air from the brush into bore 36 and passage 31 and permitting the air bubbles to ascend into reservoir 12. Due to the constant movement of the pin 32, the air bubbles are kept in motion so that no blocking or sealing of passage 31 may occur due to lack of ventilating air. It will be observed that in the modification of FIGURE 3, ventilating bore 27 of FIGURE 2 is omitted. Head 33 acts as a weight so as to maintain ball 34 in contact with the grooved surface to ensure the emission of liquid from the reservoir 12 and the wetting of the grooved surface of the record by means of brush 30.

The liquid supplied to the container may either be distilled water, distilled water containing traces of a detergent or a mixture of about 60% ethyl alcohol and 40% distilled water.

Moisture remaining on the record after playing is best removed by means of a paper handkerchief which is thrown away after use. This measure insures absence of dust or sand grains in the drying rag in contradistinction to the repeated use of a fabric rag which may give rise to scratches on the record.

Tests made with the device over long periods of time indicate not only superior results in cleaning effect as well as absence of undesirable noise during playing of records but also an improvement in records previously soiled through the use of anti-statics. With a consistent use of the device during operation of the record player wear of records and needle may practically be eliminated.

It should be apparent from the foregoing detailed description, that the objects set forth at the outset to the specification have been successfully achieved. While there is shown and described present preferred embodiment of the invention, it is to be distinctly understood that the invention is not limited thereto, and that changes may be made therein without departing from the scope of the invention which is defined in the appended claims.

What is claimed is:

1. Record cleaning device, comprising socket means adapted for connection with the frame of a record player, an arm member having a supported end and a free end, pivot means interconnecting said arm member adjacent said supported end with said socket means, a liquid container supported by said arm member and having an outlet opening and valve means cooperating with said outlet opening, cleaning pad means movably depending from said arm member adjacent said free end thereof and interconnected with said valve means to open and close said outlet opening of said fluid container.

2. Record cleaning device as defined in claim 1, wherein said arm member comprises a tube closed at both ends and forming said container.

3. Record cleaning device as defined in claim 1, wherein said arm member comprises a counterweight located adjacent said supported end thereof.

4. Record cleaning device as defined in claim 1, wherein said socket means comprises spherical bearing, said pivoting means having a ball shaped member supported in said spherical bearing, a guide pin connected to said ball shaped member, a locking sleeve frictionally engaging said guide pin and forming an abuttment for said arm member.

5. Record cleaning device as defined in claim 4, wherein said socket is formed of a resilient material and comprises a suction cup base member.

6. Record cleaning device as defined in claim 5, wherein an adhesive is provided on said suction cup base member.

7. Record cleaning device as defined in claim 1, wherein said container is supplied with liquid mixture containing distilled water and a detergent.

8. Record cleaning device as defined in claim 1, wherein said container is supplied with a liquid mixture containing distilled water and ethyl alcohol.

9. Record cleaning device as defined in claim 1, wherein said valve means comprises a sleeve having a central bore, a valve member extending downwardly through said bore, said valve member having a valve stem supporting said cleaning pad at its lower extremity, said valve member having a valve surface engaging under the influence of gravity the valve seat formed in said sleeve.

10. Record cleaning device as defined in claim 9, wherein said valve stem has a diameter less than the diameter of said bore.

11. Record cleaning device as defined in claim 1, wherein said valve means includes a downwardly extending tube having a central passage, said tube passage open at its upper end into said liquid container, said tube supporting at its lower end said brush means, a pin extending through said passage and extending into said liquid container at one end, a first ball affixed to said pin end positioned inside the liquid container and a second ball affixed to the lower end of said pin adapted to ride on a record.

12. In a record player having a mounting plate and a record turntable, the improvement of a socket member secured to said mounting plate, an upwardly extending guide pin tiltably connected to said socket member, abutment means on said guide pin, a hollow arm member supported for swivel movement on said guide pin and forming a container, a outlet valve in said container having a valve seat, a valve member movable in said valve seat, a valve member movable in said valve seat and a downwardly extending valve stem connected to said valve member and a cleaning pad supported by said valve stem and adapted to ride on a record placed on said turntable.

13. Record cleaning device, including an arm member having a supported end and a free end, means for mounting said arm supported end to the frame of a record player, a liquid container within said arm member, record cleaning means, means for mounting said record cleaning means to said arm, means for connecting the liquid container with said record cleaning means, and liquid control means to regulate the flow of liquid from said liquid container to said record cleaning means; said liquid control means introducing air into said connecting means to control the discharge of liquid from said liquid container to said liquid cleaning means.

14. Record cleaning device including an arm member having a supported end and a free end, means for mounting said arm supported end to the frame of a record player, a liquid container within said arm member, record cleaning means, means for mounting said record cleaning means to said arm, means for connecting the liquid container with said record cleaning means, liquid control means to regulate the flow of liquid from said liquid container to said record cleaning means, said liquid container having a removable hollow cap member at its free end, locating means to seat said cap relative to said arm member, and a downwardly extending hollow tube member connected to the interior of said cap member for mounting said record cleaning means in the lower extremity of said tube member, at least one bore in said record cleaning means connecting the hollow interior of said tube with said record cleaning means and a ventilating bore in said cap member.

References Cited

UNITED STATES PATENTS

| | | | |
|---|---|---|---|
| 3,355,177 | 10/1967 | King | 274—47 |
| 2,977,127 | 3/1961 | Mertes | 274—47 |

FOREIGN PATENTS

| | | |
|---|---|---|
| 817,598 | 8/1959 | Great Britain. |

LEONARD FORMAN, Primary Examiner

F. J. D'AMBROSIO, Assistant Examiner

U.S. Cl. X.R.

15—104.92